Jan. 9, 1934.  R. H. HARRINGTON  1,943,237
ADVERTISING DEVICE
Filed Sept. 21, 1932

INVENTOR
Ralph H. Harrington
BY Evans & McCoy
ATTORNEYS

Patented Jan. 9, 1934

1,943,237

UNITED STATES PATENT OFFICE 1,943,237

ADVERTISING DEVICE

Ralph H. Harrington, Akron, Ohio, assignor to The General Tire & Rubber Company, Akron, Ohio, a corporation of Ohio Application September 21, 1932
Serial No. 634,131

4 Claims. (Cl. 40—125)

This invention relates to an advertising device and more particularly to an improved device for supporting advertising matter in tire casings on display.

In the past the space positioned within the circle formed by a tire bead has been used in a variety of ways for the purpose of carrying advertising matter for window display. For instance, advertising matter printed on stiff cardboard of novel shapes has been mounted within tire casings for display of the advertising matter. The handling of such advertising displays is inconvenient because of their bulk, their expense of manufacture, and the expense of shipping in order to prevent injury before they are used for the intended purpose. Other more costly and more complicated frames have been proposed for supporting thin sheet advertising material.

The present invention proposes a display frame comprising a flat, circular plate of thin gauge metal having simple means for securing thin sheets of advertising material in flat condition upon the surface of the display frame. Paper or thin sheet displays for use in the frame may be conveniently and inexpensively shipped in suitable mailing tubes and the display readily mounted in the frame without removing the frame from the tire casing.

One of the objects of the present invention is to provide an attractive and inexpensive advertisement supporting display frame in which paper or fabric advertising displays may be successively mounted in said frame in a flat condition in a simple and easy manner.

Another object is to provide an advertisement display frame which may be mounted in a tire casing and which serves to removably position a thin sheet of advertising material centrally of the tire casing for display purposes.

Another object is to provide an advertisement display frame which may be quickly, easily and simply applied to a tire casing and upon which advertising matter in thin sheet form may be easily interchanged by an inexperienced user without removing the frame from the tire casing.

A further object is to provide an advertisement display frame capable of positively and smoothly supporting a thin sheet of advertising matter by easily removable means for securing the sheet in position.

With the above and other objects in view, which will be apparent to those skilled in the art to which the invention appertains, the invention may be said to consist in the following combinations and associations of parts shown in the drawing, in which, Figure 1 is a front, elevational view of a tire casing showing a display frame in mounted position;

Figure 2:
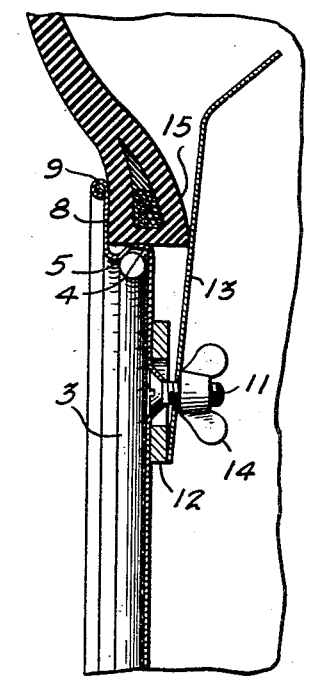
Fig. 2 is a sectional view taken along line 2—2 of Fig. 1.
Figure 1:
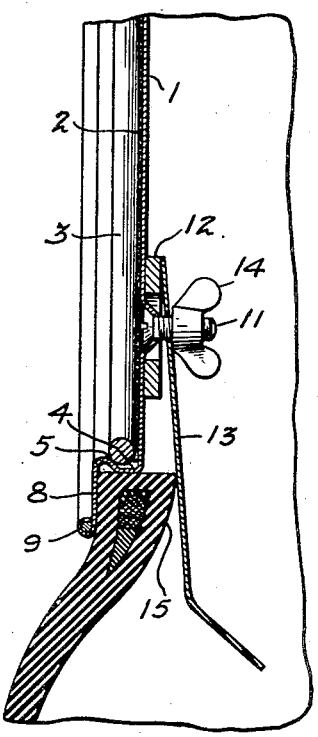
Figure 1:
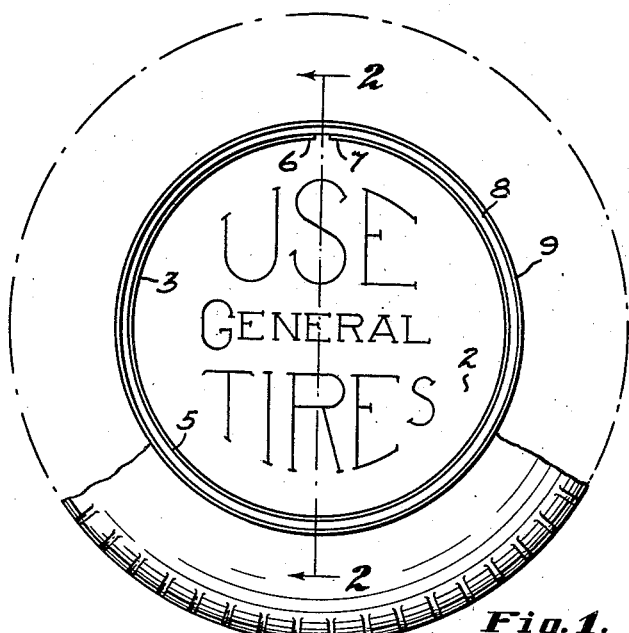
Figure 3:
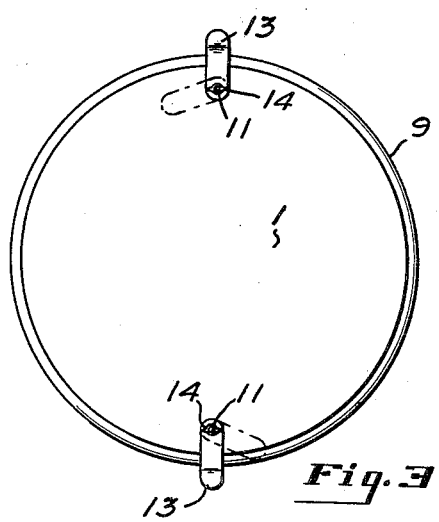
Fig. 3 is a rear, plan view of the display frame.

A preferred form of display frame embodying the invention is formed of sheet metal and comprises a circular advertisement carrying portion 1 against which a sheet of advertising material 2 is securely held in flat, unwrinkled condition by a split spring ring 3. The spring ring is preferably positioned within a ring groove 4, or similar channel, having an inclined face 5 contacting one side of the spring ring and operating with the radially outwardly pressing force of the spring ring to hold the advertisement contacting side of the spring ring in closely compressing relation against the periphery of the circular sheet of advertising material. The spring ring has two spaced end portions 6 and 7, the separation of which allows the ring freedom in tightly seating itself within the ring groove and also provides means beneath which a tool may be inserted for the purpose of removing the ring from its groove. A flange 8 having a rolled peripheral edge 9 forms an attractive border for the advertising matter and simulates a bead retaining flange of an automobile tire wheel.

Suitable apertures having frustoconical rims for housing the heads of bolts 11 or other suitable arm-securing means are formed through the depressed advertisement-carrying portion 1 of the frame. The heads of the bolts are preferably countersunk flush with the surface of the advertisement-carrying side of the frame to prevent any possible unseemly bulge in the advertising matter overlying the bolt head.

A thick washer 12, or other similar device is positioned about the bolt upon the rear side of the frame and acts as a rest for the short end of a bead engaging arm 13 which is apertured adjacent one end to receive the bolt 11 and which is retained in place by a suitable form of nut such as the wing nut 14. A tire bead 15 preferably seats against the shoulder formed on the rear side of the frame by the junction of the ring groove and the flange. Upon the tightening of the nut 14 the long end of the arm 13 releasably engages one side of the tire bead 15 and presses the head tightly into the shoulder. The arm 13 is preferably made rotatable about the bolt 11 and may or may not partially conform to the shape of the tire bead as desired.

The display frame is quickly and easily mounted in a tire casing. The wing nut is released and the arm rotated to permit the positioning of the shoulder at the rear of the frame against one of the tire beads. The arm is again rotated to overlie the tire bead and the wing nut tightened just sufficiently to firmly hold the display frame in place. The frame is then properly positioned upon the tire and adapted to receive as many changes in advertising material as is desired.

Advertising material is very easily installed on or removed from the display frame. The advertising matter is first placed upon the advertisement-carrying portion of the frame in the position illustrated. One end of the spring ring is then placed against the periphery of the advertising matter and the ring is sprung into the groove and the installing operation is completed.

The resulting sign is neat and very attractive. The flat, smooth advertising matter surrounded by the border portion 8 of the frame and the black side wall of the tire casing provides a very pleasing advertising medium for automobile tires.

The present invention has important advantages over advertising devices developed for a similar purpose and which have been proposed in the past. The display frame will carry thin sheets of advertising material and it provides an inexpensive and attractive piece of more or less permanent equipment which a tire manufacturer may furnish the dealers marketing his tires. Thin sheets of advertising material may also be provided by the tire manufacturer and periodically distributed to his dealers for mounting in a display frame. Such advertising materials may be prepared and distributed at a small cost because both the frame and the paper carried by the frame are relatively inexpensive to make and, since they are light and compact, their mailing expense is low.

It is to be understood that the particular embodiments of the present invention shown and described are presented for purposes of illustration and explanation and that various modifications in the means for securing the advertising matter in place, in the design of the rim, and in the particular parts securing the frame to the bead of the tire or for otherwise mounting the frame, may be made without departing from the invention as defined in the appended claims.

What I claim is:

1. An advertisement display frame for mounting in a tire casing having bead portions comprising, a sheet metal plate having a radially extending flange portion offset outwardly from said plate and designed to overlie the bead portion of the tire casing, an annular axially extending portion connecting said flange and said plate, said annular portion slightly overhanging the edge portions of said plate to provide a spring ring engaging face inclined toward the plate, and a spring ring designed to engage the inclined face whereby said spring ring is forced against said plate portion by the expansion forces in said ring and means for securing the frame to a bead of the tire.

2. A display frame for supporting advertising matter of sheet form in a tire casing having beads comprising, an advertisement supporting portion, a spring ring, a spring ring groove positioned around said advertisement supporting portion and having an inclined face for moving said spring ring into yielding engagement with said advertisement-supporting portion, an advertisement on thin sheet material positioned upon said advertisement-supporting portion and secured in place by said ring, a flange portion positioned outwardly of said ring groove and terminating radially outwardly in a closely rolled peripheral rim, and bead gripping means for securing the frame to a tire casing.

3. An advertisement display frame for attachment to an annular bead of a pneumatic tire casing, comprising a peripheral rim portion adapted to engage the outer face of a tire bead, a body portion inset with respect to the rim portion and an annular tire bead seating shoulder connecting the rim and body portion, a bead engaging arm mounted upon the back of said body portion movable to a position overlying the interior of the tire bead engaged by said rim and seated on said shoulder to secure said frame to the tire bead, and to a position clear of said tire bead to free the same from the tire bead, and means to adjust said arm to vary the pressure applied to said tire bead clamped between the arm and rim.

4. An advertisement display frame in the form of a cover for the central opening within one of the beads of a pneumatic tire casing comprising a circular sheet metal stamping having an annular rim portion adapted to engage the outer face of a tire bead, a body portion inset with respect to the rim portion and an annular shoulder connecting the rim and body portions and of a diameter to seat within a bead of the tire casing, and clamping means mounted upon the back of the body portion for engagement at spaced points with the inner side of the bead engaged by said rim portion to secure said frame to the tire bead within which said shoulder is seated.

RALPH H. HARRINGTON.